(12) United States Patent
Furusawa et al.

(10) Patent No.: US 10,576,789 B2
(45) Date of Patent: Mar. 3, 2020

(54) PNEUMATIC TIRE

(71) Applicant: The Yokohama Rubber Co., Ltd., Minato-ku, Tokyo (JP)

(72) Inventors: Hiroshi Furusawa, Hiratsuka (JP); Masaaki Miyoshi, Hiratsuka (JP)

(73) Assignee: The Yokohama Rubber Co., LTD. (JP)

( * ) Notice: Subject to any disclaimer, the term of this patent is extended or adjusted under 35 U.S.C. 154(b) by 53 days.

(21) Appl. No.: 15/022,911

(22) PCT Filed: Sep. 12, 2014

(86) PCT No.: PCT/JP2014/074284
§ 371 (c)(1),
(2) Date: Mar. 17, 2016

(87) PCT Pub. No.: WO2015/041179
PCT Pub. Date: Mar. 26, 2015

(65) Prior Publication Data
US 2016/0229231 A1    Aug. 11, 2016

(30) Foreign Application Priority Data

Sep. 17, 2013    (JP) .................................. 2013-191869

(51) Int. Cl.
*B60C 11/03*         (2006.01)
*B60C 11/00*         (2006.01)
(Continued)

(52) U.S. Cl.
CPC ........ *B60C 11/0332* (2013.01); *B60C 11/005* (2013.01); *B60C 11/0008* (2013.01);
(Continued)

(58) Field of Classification Search
CPC ............. B60C 11/0332; B60C 11/0008; B60C 11/0302; B60C 11/0306; B60C 11/0309;
(Continued)

(56) References Cited

U.S. PATENT DOCUMENTS 2,850,066 A * 9/1958 Nellen .................... B60C 11/04
152/209.21
6,116,309 A * 9/2000 Gillard ................ B60C 11/0083
152/209.14
(Continued)

FOREIGN PATENT DOCUMENTS

CN         1990280         7/2007
EP         1 920 951       5/2008
(Continued)

OTHER PUBLICATIONS

JPH06227211—Machine Translation (Year: 1994).*
International Search Report for International Application No. PCT/JP2014/074284 dated Oct. 21, 2014, 4 pages, Japan.

*Primary Examiner* — Matthew J Daniels
*Assistant Examiner* — Yunju Kim
(74) *Attorney, Agent, or Firm* — Thorpe North & Western

(57) ABSTRACT

There is provided a pneumatic tire, in which a first set of blocks that is partitioned and formed by two first circumferential grooves and a plurality of first lateral grooves is provided in the center region that includes the tire equatorial plane, a second set of blocks that is partitioned and formed by one second circumferential groove and a plurality of second lateral grooves is provided in the outermost portion in the tire width direction on each side in the tire width direction, a rib is provided between the first set of blocks and the second sets of blocks, the rib is divided by at least one third circumferential groove, and a plurality of sipes is formed in the first set of blocks, the second set of blocks, and the rib.

17 Claims, 7 Drawing Sheets

(51) Int. Cl.
*B60C 11/13* (2006.01)
*B60C 11/12* (2006.01)
*B60C 11/04* (2006.01)

(52) U.S. Cl.
CPC ...... *B60C 11/0302* (2013.01); *B60C 11/0306* (2013.01); *B60C 11/0309* (2013.01); *B60C 11/1218* (2013.01); *B60C 11/1307* (2013.01); *B60C 2011/0016* (2013.01); *B60C 2011/0334* (2013.01); *B60C 2011/0341* (2013.01); *B60C 2011/0346* (2013.01); *B60C 2011/0348* (2013.01); *B60C 2011/0358* (2013.01); *B60C 2011/0386* (2013.01); *B60C 2011/1213* (2013.01); *B60C 2011/1338* (2013.01)

(58) Field of Classification Search
CPC ............ B60C 11/1218; B60C 11/1307; B60C 2011/0016; B60C 2011/0334; B60C 2011/0341; B60C 2011/0346; B60C 2011/0348; B60C 2011/0358; B60C 2011/0386; B60C 2011/1213; B60C 2011/1338; B60C 11/0083; B60C 11/04; B60C 11/12
USPC .................................................... 152/209.21
See application file for complete search history.

(56) References Cited

U.S. PATENT DOCUMENTS

| | | |
|---|---|---|
| 6,142,200 A | 11/2000 | Feider et al. |
| 2007/0089821 A1 | 4/2007 | Kishizoe |
| 2007/0125469 A1 | 6/2007 | Poling et al. |
| 2008/0128061 A1 | 6/2008 | Puhala et al. |
| 2009/0294003 A1 | 12/2009 | Horiuchi |
| 2011/0100519 A1* | 5/2011 | Yamakawa ......... B60C 11/0302 152/209.18 |
| 2011/0192514 A1* | 8/2011 | Ochi ................... B60C 11/0302 152/209.18 |
| 2012/0118454 A1 | 5/2012 | Nagayasu et al. |
| 2012/0273104 A1* | 11/2012 | Ishida .................... B60C 11/04 152/209.18 |
| 2012/0285591 A1 | 11/2012 | Nagayasu et al. |
| 2012/0305155 A1* | 12/2012 | Hamanaka ............. B60C 11/11 152/209.18 |
| 2013/0146192 A1* | 6/2013 | Miyoshi ............. B60C 11/1315 152/209.25 |
| 2013/0160909 A1 | 6/2013 | Atake |

FOREIGN PATENT DOCUMENTS

| | | | |
|---|---|---|---|
| EP | 2 130 692 | 12/2009 | |
| JP | H06227211 A * | 8/1994 | ............... B60C 1/00 |
| JP | H11-0342706 | 12/1999 | |
| JP | H11-342706 | 12/1999 | |
| JP | 2006-131098 | 5/2006 | |
| JP | 2007-153322 | 6/2007 | |
| JP | 2008-120130 | 5/2008 | |
| JP | 2009-241626 | 10/2009 | |
| JP | 2012-121542 | 6/2012 | |
| JP | 2012-236510 | 12/2012 | |
| JP | 2012-245858 | 12/2012 | |
| JP | 2013-132966 | 7/2013 | |
| WO | WO 2015-003827 | 1/2017 | |

* cited by examiner

PNEUMATIC TIRE

TECHNICAL FIELD

The present technology relates to a pneumatic tire with improved braking performance on ice, while minimizing any reduction in the braking performance on snow.

BACKGROUND ART

Conventionally, technology for improving the braking performance on snow and the braking performance on ice by providing a plurality of blocks 120 on a tread surface 110 of a pneumatic tire 100, and forming a plurality of sipes 130 in each block is known, as illustrated in FIG. 7. However, in the pneumatic tire 100, the groove area is large, so the tire ground contact area is reduced. As a result, the braking performance on ice was not sufficient.

Therefore, in the pneumatic tires disclosed in Japanese Unexamined Patent Application Publication No. H11-342706 and Japanese Unexamined Patent Application Publication No. 2009-241626, a tread pattern that combines blocks and ribs is adopted in order to improve the braking performance on snow and the braking performance on ice in a balanced manner.

However, in the pneumatic tire disclosed in Japanese Unexamined Patent Application Publication No. H11-342706, the ribs are provided on only one side in the tire width direction (vehicle mounting outer side), so there is a possibility that the braking performance on ice cannot be improved sufficiently. Also, in the pneumatic tire disclosed in Japanese Unexamined Patent Application Publication No. 2009-241626, the blocks are provided only on both outer sides in the tire width direction (shoulder regions), so there is a possibility that the braking performance on snow will be greatly reduced.

SUMMARY

The present technology provides a pneumatic tire with improved braking performance on ice, while minimizing any reduction in the braking performance on snow.

In a first aspect of the present technology, a pneumatic tire is provided in which a first set of blocks that is partitioned and formed by two first circumferential grooves and a plurality of first lateral grooves is provided in the center region that includes the tire equatorial plane, a second set of blocks that is partitioned and formed by one second circumferential groove and a plurality of second lateral grooves is provided in the outermost portion in the tire width direction on each side in the tire width direction, a rib is provided between the first set of blocks and the second sets of blocks, the rib is divided by at least one third circumferential groove, and a plurality of sipes is formed in the first set of blocks, the second set of blocks, and the rib.

In a second aspect of the present technology, the second circumferential groove is offset in the tire width direction in at least two locations in the tire circumferential direction.

In a third aspect of the present technology, the amount of offset of the second circumferential groove is not less than 0.5 mm and not more than 3.0 mm.

In a fourth aspect of the present technology, the first circumferential groove is offset in the tire width direction in at least two locations in the tire circumferential direction.

In a fifth aspect of the present technology, the amount of offset of the first circumferential groove is not less than 0.5 mm and not more than 3.0 mm.

In a sixth aspect of the present technology, the third circumferential groove is offset in the tire width direction in at least two locations in the tire circumferential direction.

In a seventh aspect of the present technology, the amount of offset of the third circumferential groove is not less than 0.5 mm and not more than 3.0 mm.

In an eighth aspect of the present technology, the sipe is a three-dimensional sipe.

In a ninth aspect of the present technology, the pneumatic tire has a directional pattern, and the tire forward direction is specified.

In a tenth aspect of the present technology, the sipes are defined by a first wall surface and a second wall surface. The first wall surface and the second wall surface have a protrusion that is not normal to the tread surface, and, are configured so that the amount of collapse in the tire circumferential direction of the first set of blocks, the second set of blocks, and the ribs is greater when a load is applied from the second wall surface side toward the first wall surface side than when a load is applied from the first wall surface side toward the second wall surface side. In the sipes formed in a region on the inner side in the tire width direction from the third circumferential groove of the rib and the sipes formed in the first set of blocks, the first wall surface is disposed on the leading edge in the tire rotational direction and the second wall surface is disposed on the trailing edge in the tire rotational direction. In the sipes formed in the region on the outer side in the tire width direction from the third circumferential groove of the rib and the sipes formed in the second set of blocks, the first wall surface is disposed on the trailing edge and the second wall surface is disposed on the leading edge.

In an eleventh aspect of the present technology, the snow traction index STI is not less than 160 and not more than 240.

In a twelfth aspect of the present technology, the Japanese Industrial Standard JIS A hardness of a cap rubber layer of the tread portion is not less than 40 and not more than 60.

According to the present technology, by providing the first set of blocks in the center region and the second set of blocks in the outermost portions in the tire width direction, reduction in the braking performance on snow can be minimized. Also, by providing the rib between the first set of blocks and the second sets of blocks, the braking performance on ice can be improved. In addition, by providing the third circumferential groove dividing the rib, the reduction in braking performance on snow due to providing the rib can be minimized. In addition, by forming the plurality of sipes in the first set of blocks, the second set of blocks, and the rib, the braking performance on snow and the braking performance on ice can be improved. As a result, the present technology can provide a pneumatic tire with improved braking performance on ice, while minimizing any reduction in the braking performance on snow.

DETAILED DESCRIPTION

The following is a description of the embodiments of the present technology (hereinafter, referred to as the Basic Embodiment and Additional Embodiments 1 to 11), with reference to the drawings. Note that the present technology is not limited to these embodiments. The constituents of the embodiments include constituents that can be easily replaced by those skilled in the art and constituents substantially same as the constituents of the embodiment. In addition, each of the forms included in the embodiments can be combined in any way.

First, the following terminology that is used in the description of the embodiments is defined. The tire radial direction is a direction orthogonal to the rotational axis of the pneumatic tire. The inner side in the tire radial direction is the side toward the rotational axis in the tire radial direction. The outer side in the tire radial direction is the side away from the rotational axis in the tire radial direction. The tire circumferential direction is the circumferential direction with the rotational axis as the central axis. The tire width direction is the direction parallel to the rotational axis. The inner side in the tire width direction is the side toward the tire equatorial plane in the tire width direction. The outer side in the tire width direction is the side away from the tire equatorial plane in the tire width direction. Note that the tire equatorial plane refers to the plane that is orthogonal to the rotational axis of the pneumatic tire and that passes through the center of the breadth of the pneumatic tire.

Basic Embodiment

Figure 1:
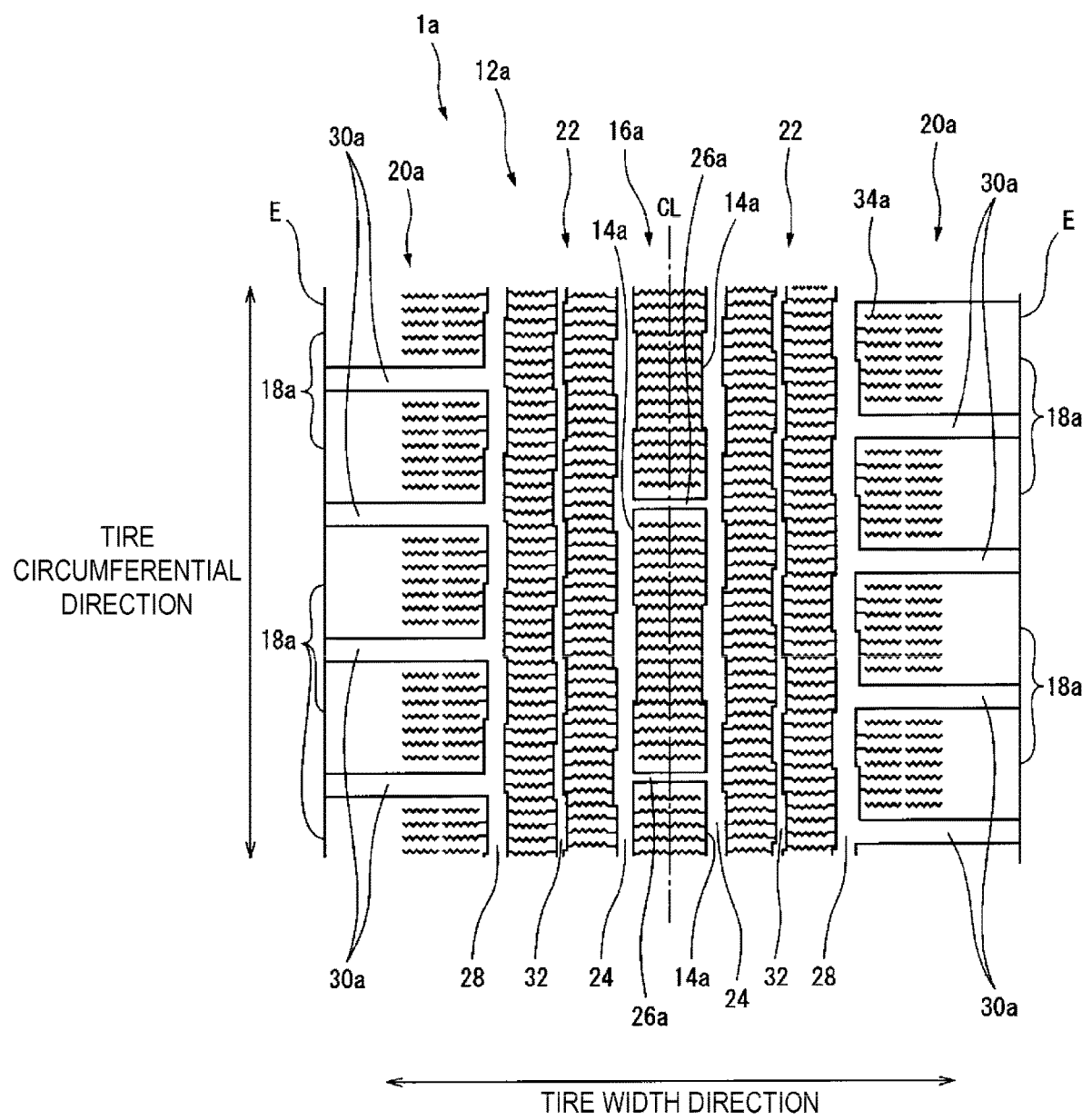
FIG. 1 is a developed plan view of a tread surface of a pneumatic tire according to an embodiment of the present technology.

A Basic Embodiment of the pneumatic tire according to the present technology will now be described. FIG. 1 is a developed plan view of a tread surface of a pneumatic tire according to an embodiment of the present technology. Note that the symbol E in FIG. 1 indicates the tire ground contact edge.

The tread portion of a pneumatic tire 1a is made from a rubber material (tread rubber). The surface of the tread portion (tread surface 12a) located on the outermost part in the tire radial direction contacts the road surface when the vehicle is traveling. Also, as illustrated in FIG. 1, a tread pattern with a predetermined design is formed in the tread surface 12a.

A first set of blocks 16a formed from a plurality of first blocks 14a is provided in the center region of the tread surface 12a that includes the tire equatorial plane CL, and a second set of blocks 20a formed from a plurality of second blocks 18a is provided on the outermost part in the tire width direction on each side in the tire width direction. Also, ribs 22 are provided between the first set of blocks 16a and the second sets of blocks 20a.

The first set of blocks 16a is partitioned and formed by two first circumferential grooves 24 extending in the tire circumferential direction, and a plurality of first lateral grooves 26a extending in the tire width direction. The two first circumferential grooves 24 are provided in regions on the inner side in the tire width direction symmetrically with respect to the tire equatorial plane CL, as illustrated in FIG. 1. Also, each of the plurality of first lateral grooves 26a extends in the tire width direction passing over the tire equatorial plane CL, and communicates with the two first circumferential grooves 24.

The second set of blocks 20a is partitioned and formed by one second circumferential groove 28 extending in the tire circumferential direction, and a plurality of second lateral grooves 30a extending in the tire width direction. The two second circumferential grooves 28 on both sides in the tire width direction are provided in regions on the outer side in the tire width direction symmetrically with respect to the tire equatorial plane CL. Also, the plurality of second lateral grooves 30a extends from the second circumferential groove 28 to the outer side in the tire width direction on each side in the tire width direction.

The ribs 22 are divided in the tire width direction by a single third circumferential groove 32 extending in the tire circumferential direction. Note that there may be two or more third circumferential grooves 32 dividing the ribs 22.

A plurality of sipes 34a is formed in each of the first set of blocks 16a, the second set of blocks 20a, and the ribs 22. The sipes 34a extend in a zigzag manner in the tire width direction. Note that, although not illustrated on the drawings, the sipes 34a extend in the tire radial direction, normal to the tread surface.

The first circumferential grooves 24 and the second circumferential grooves 28 have a maximum groove width of not less than 4 mm and not more than 8 mm. The maximum groove width of the third circumferential groove 32 is not less than 1 mm and not more than 5 mm. Also, the maximum groove width of the first lateral grooves 26a is not less than 1 mm and not more than 3 mm, and the maximum groove width of the second lateral grooves 30a is not less than 5 mm and not more than 8 mm. The maximum groove width of the sipes 34a is less than 1 mm. Here, the groove width means the groove dimension in a direction normal to the direction that the groove extends.

In the pneumatic tire 1a, sufficient groove area can be provided on the tread surface 12a by providing the first set of blocks 16a in the center region, and providing the second set of blocks 20a on the outermost part in the tire width direction. As a result, a large quantity of snow can be compacted when driving on snow, so the reduction in braking performance on snow can be minimized. Also, sufficient ground contact area is provided on the tread surface 12a by providing the ribs 22 between the first set of blocks 16a and the second sets of blocks 20a, so the braking performance on ice can be improved. In addition, the reduction in groove area by providing the ribs 22 can be minimized by providing the third circumferential groove 32 dividing the ribs 22, so the reduction in braking performance on snow can be minimized. In addition, the water removal performance of removing the water film on the road surface can be increased by forming the plurality of sipes 34a in the first set of blocks 16a, the second sets of blocks 20a, and the ribs 22, and the edge effect of scraping the snow and ice can be increased, so the braking performance on snow and the braking performance on ice can be improved. Therefore, according to the pneumatic tire 1a, it is possible to improve the braking performance on ice, while minimizing any reduction in the braking performance on snow.

Note that although not illustrated on the drawings, the pneumatic tire 1a has a meridian cross-section form similar to that of a conventional pneumatic tire. Here, the meridian cross-section form of the pneumatic tire refers to the cross-sectional shape of the pneumatic tire as it appears on a plane normal to the tire equatorial plane CL. The pneumatic tire 1a includes a bead portion, a side wall portion, a shoulder portion, and the tread portion in that order from the inner side in the tire radial direction toward the outer side in a meridian cross-section view. Also, in a meridian cross-section, the pneumatic tire 1a is provided with a carcass layer that extends from the tread portion to the bead portion on both sides and is wound around a pair of bead cores, and a belt layer and a belt reinforcing layer formed upon the carcass layers in that order outward in the tire radial direction.

Furthermore, the pneumatic tire 1a is obtained through each of the normal manufacturing steps including a step of mixing the tire materials, a step of processing the tire materials, a step of molding a green tire, a vulcanization step, an inspection step after vulcanization, and the like. In the manufacturing steps of the pneumatic tire 1a, in particular, recesses and protrusions corresponding to the tread pattern illustrated in FIG. 1 are formed on the inner wall of the vulcanization mold, and the vulcanization is carried out using this mold.

Additional Embodiments

Next, descriptions are made of Additional Embodiments 1 to 11 which can be optionally implemented on the Basic Embodiment of the pneumatic tire according to the present technology described above.

Additional Embodiment 1

In the Basic Embodiment, preferably, the second circumferential groove 28 is offset in the tire width direction in at least two locations in the tire circumferential direction, as illustrated in FIG. 1 (Additional Embodiment 1).

In this Specification, a circumferential groove is offset in the tire width direction in at least two locations in the tire circumferential direction means any of the following three cases: namely, a case in which there is a change in the groove width of the circumferential groove in at least two positions in the tire circumferential direction, but there is no deviation of the groove width center line in the tire width direction; a case in which there is a change in the groove width of the circumferential groove and there is a deviation of the groove width center line in the tire width direction; and a case in which there is no change in the groove width of the circumferential groove but there is a deviation of the groove width center line in the tire width direction. Here, the groove width means the groove dimension in a direction normal to the direction that the groove extends, as stated above, and the groove width center line means the line passing through the center points in the groove width.

Figure 2:
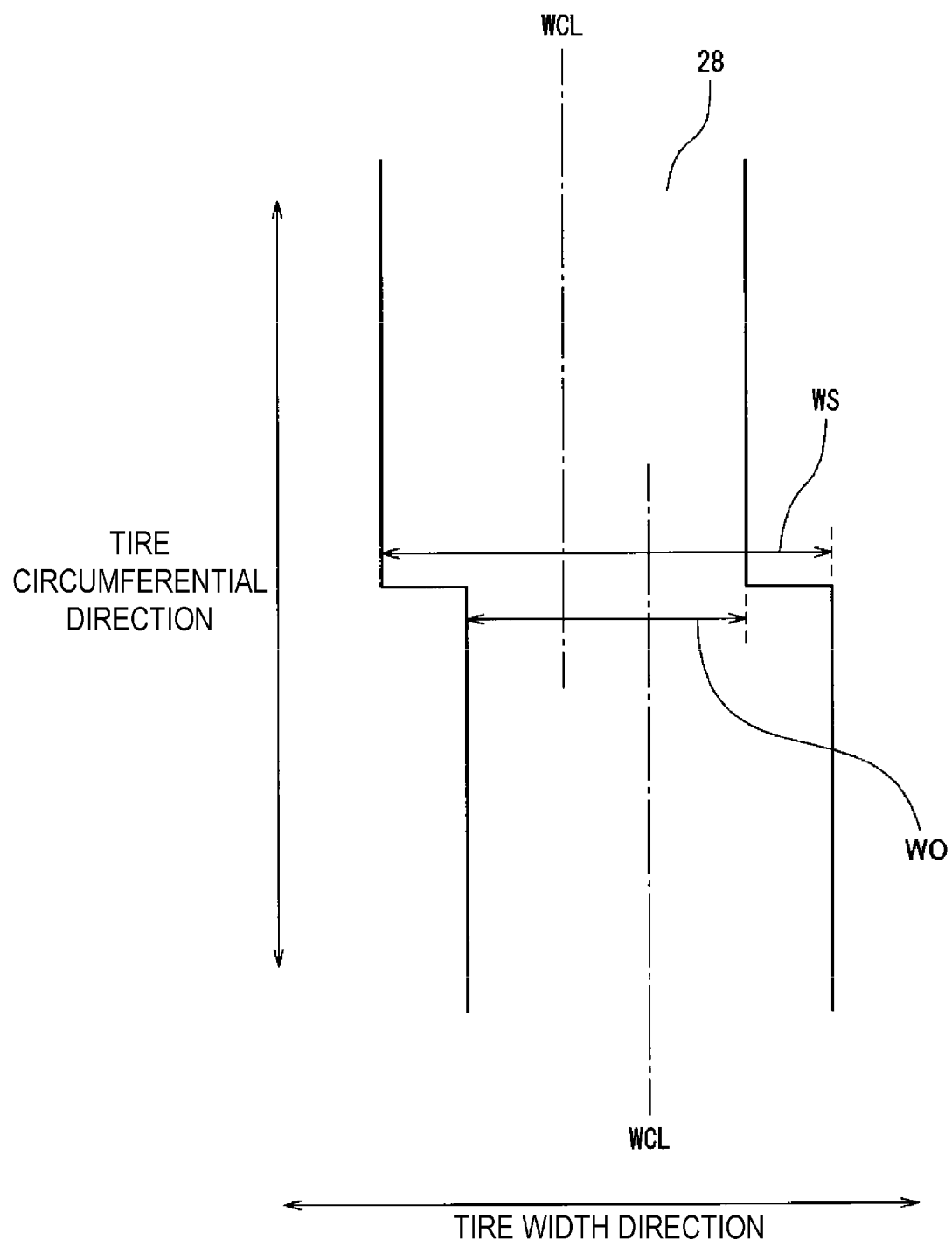
FIG. 2 is an enlarged view of the offset position of a second circumferential groove.

FIG. 2 is a partial enlarged view of an offset position of the second circumferential groove 28. As illustrated in FIG. 1, the second circumferential groove 28 has a constant groove width along the tire circumferential direction. As can be seen from FIG. 2, the second circumferential groove 28 is offset in the tire width direction by shifting the groove width center line WCL in the tire width direction, without changing the groove width. Note that the second circumferential groove 28 may have two or more types of groove width.

By offsetting the second circumferential groove 28 in the tire width direction in at least two locations in the tire circumferential direction, when the tire is rolling on a snow surface, the snow that has entered on each side in the tire circumferential direction of the offset location forms an independent snow column, so the snow can be effectively compacted when driving on snow. As a result, the shear force of the snow column can be increased, so the reduction in braking performance on snow can be further minimized.

Additional Embodiment 2

In an embodiment that combines the Basic Embodiment with Additional Embodiment 1, preferably, the offset amount of the second circumferential groove 28 is not less than 0.5 mm and not more than 3.0 mm (Additional Embodiment 2). Here, the offset amount means, at the location in the tire circumferential direction of an offset position, the difference between the total dimension WS in the tire width direction of the two groove portions on both sides of the offset position in the tire circumferential direction, and the overlapping dimension W0 in the tire width direction, as illustrated in FIG. 2.

By making the offset amount of the second circumferential groove 28 not less than 0.5 mm, when the tire is rolling on a snow surface, the snow that has entered on each side in the tire circumferential direction of the offset position forms snow columns in a form that is more independent from each other. As a result, the shear force of the snow column can be further increased, so the reduction in braking performance on snow can be further minimized. Also, by making the offset amount of the second circumferential groove 28 not more than 3.0 mm, the deterioration in the water drainage properties due to the obstruction of the flow of water in the tire circumferential direction at the offset location can be minimized.

Additional Embodiment 3

In an embodiment that combines the Basic Embodiment with Additional Embodiment 1, preferably, the first circumferential groove 24 is offset in the tire width direction in at least two locations in the tire circumferential direction, as illustrated in FIG. 1 (Additional Embodiment 3).

As illustrated in FIG. 1, the first circumferential groove 24 has three types of groove width. The first circumferential groove 24 is offset in the tire width direction by changing the groove width and shifting the groove width center line in the tire width direction. Note that the first circumferential groove 24 may be offset in the tire width direction by changing the groove width but not shifting the groove width center line in the tire width direction. Also, the first circumferential groove 24 may have one, two, or four or more types of groove width.

By offsetting the first circumferential groove 24 in the tire width direction in at least two locations in the tire circumferential direction, when the tire is rolling on a snow surface, the snow that has entered on each side in the tire circumferential direction of the offset location forms an independent snow column, so the snow can be effectively compacted when driving on snow. As a result, the shear force of the snow can be increased, so the reduction in braking performance on snow can be further minimized.

Additional Embodiment 4

In an embodiment that combines the Basic Embodiment with Additional Embodiments 1 and 3, preferably, the offset amount of the first circumferential groove 24 is not less than 0.5 mm and not more than 3.0 mm (Additional Embodiment 4).

By making the offset amount of the first circumferential groove 24 not less than 0.5 mm, when the tire is rolling on a snow surface, the snow that has entered on each side in the tire circumferential direction of the offset position forms snow columns in a form that is more independent from each other. As a result, the shear force of the snow can be further increased, so the reduction in braking performance on snow can be further minimized. Also, by making the offset amount of the first circumferential groove 24 not more than 3.0 mm, the deterioration in the water drainage properties due to the obstruction of the flow of water in the tire circumferential direction at the offset location can be minimized.

Additional Embodiment 5

In an embodiment that combines the Basic Embodiment with Additional Embodiment 1, preferably, the third circumferential groove 32 is offset in the tire width direction in at least two locations in the tire circumferential direction, as illustrated in FIG. 1 (Additional Embodiment 5).

As illustrated in FIG. 1, the third circumferential groove 32 has two types of groove width. The third circumferential groove 32 is offset in the tire width direction by either changing the groove width and shifting the groove width center line in the tire width direction, or not changing the groove width and shifting the groove width center line in the tire width direction. Note that the third circumferential groove 32 may be offset in the tire width direction by changing the groove width but not shifting the groove width center line in the tire width direction. Also, the third circumferential groove 32 may have one, or three or more types of groove width.

By offsetting the third circumferential groove 32 in the tire width direction in at least two locations in the tire circumferential direction, when the tire is rolling on a snow surface, the snow that has entered on each side in the tire circumferential direction of the offset location forms an independent snow column, so the snow can be effectively compacted when driving on snow. As a result, the shear force of the snow can be increased, so the reduction in braking performance on snow can be further minimized.

Additional Embodiment 6

In an embodiment that combines the Basic Embodiment with Additional Embodiments 1 and 5, preferably, the offset amount of the third circumferential groove 32 is not less than 0.5 mm and not more than 3.0 mm (Additional Embodiment 6).

By making the offset amount of the third circumferential groove 32 not less than 0.5 mm, when the tire is rolling on a snow surface, the snow that has entered on each side in the tire circumferential direction of the offset position forms snow columns in a form that is more independent from each other. As a result, the shear force of the snow can be further increased, so the reduction in braking performance on snow can be further minimized. Also, by making the offset amount of the third circumferential groove 32 not more than 3.0 mm, the deterioration in the water drainage properties due to the obstruction of the flow of water in the tire circumferential direction at the offset location can be minimized.

Additional Embodiment 7

In the Basic Embodiment or an embodiment that combines the Basic Embodiment with Additional Embodiment 1 and the like, preferably, the sipes are 3-dimensional sipes (Additional Embodiment 7).

Figure 3:
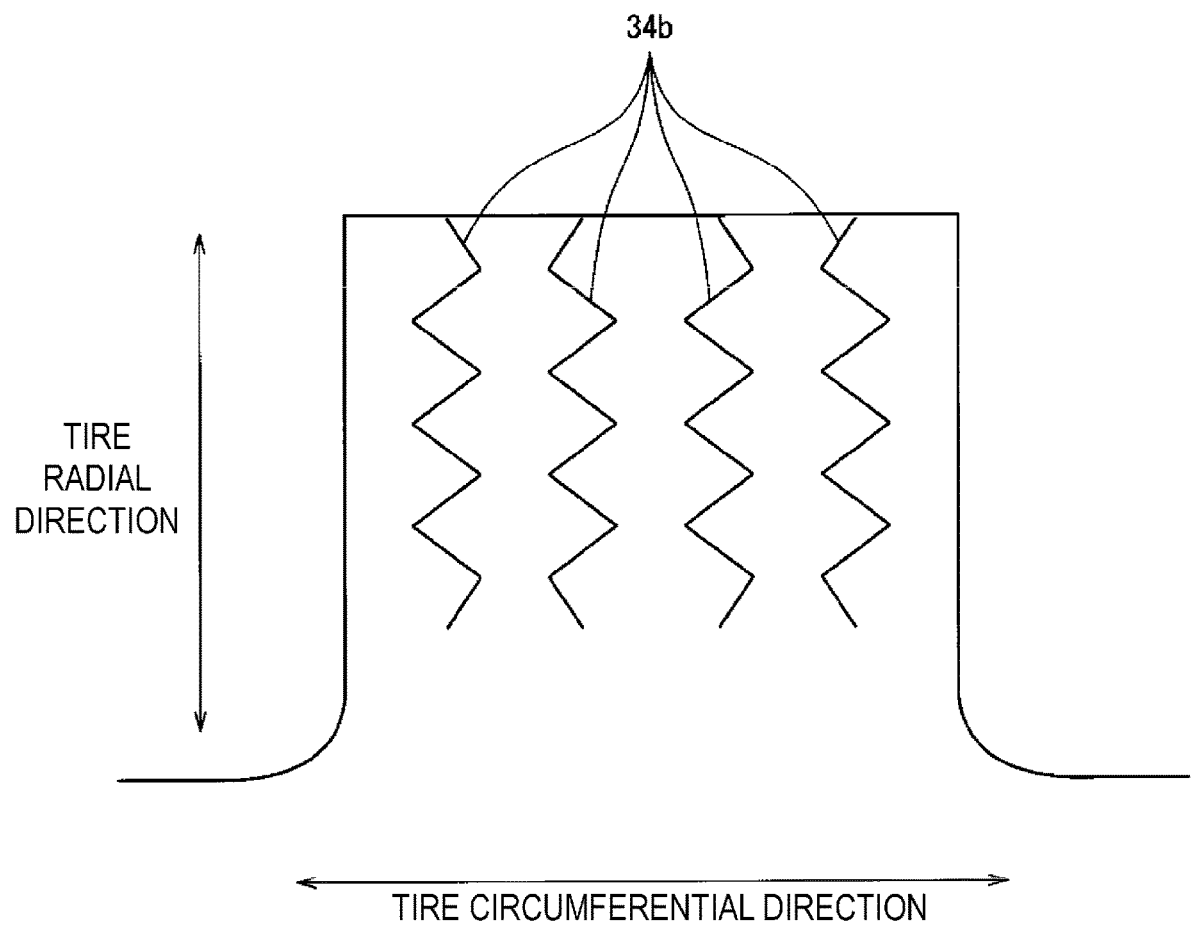
FIG. 3 is a cross-sectional view in a plane parallel to the tire equatorial plane of an illustrative 3-dimensional sipe formed in a block.

FIG. 3 is a cross-sectional view in a plane parallel to the tire equatorial plane of an illustrative 3-dimensional sipe formed in a block. A 3-dimensional sipe means a sipe 34b that not only extends bent in the tire width direction and the tire circumferential direction, as illustrated in FIG. 1, but also extends bent in the tire radial direction, as illustrated in FIG. 3.

By making the sipes 3-dimensional sipes, when a load is applied to the first blocks 14a, the second blocks 18a, and the ribs 22 in the tire circumferential direction, the wall surfaces of the sipe 34b support each other, so the reduction in ground contact area due to the collapsing of the first blocks 14a, the second blocks 18a, or the ribs 22 is reduced, and the edge effect of the sipes can be further increased. This effect can further improve the braking performance on snow and braking performance on ice.

Additional Embodiment 8

In the Basic Embodiment or an embodiment that combines the Basic Embodiment with Additional Embodiment 1 and the like, preferably, the pneumatic tire has a directional pattern, in which the tire rotational direction is designated (Additional Embodiment 8).

Figure 4:
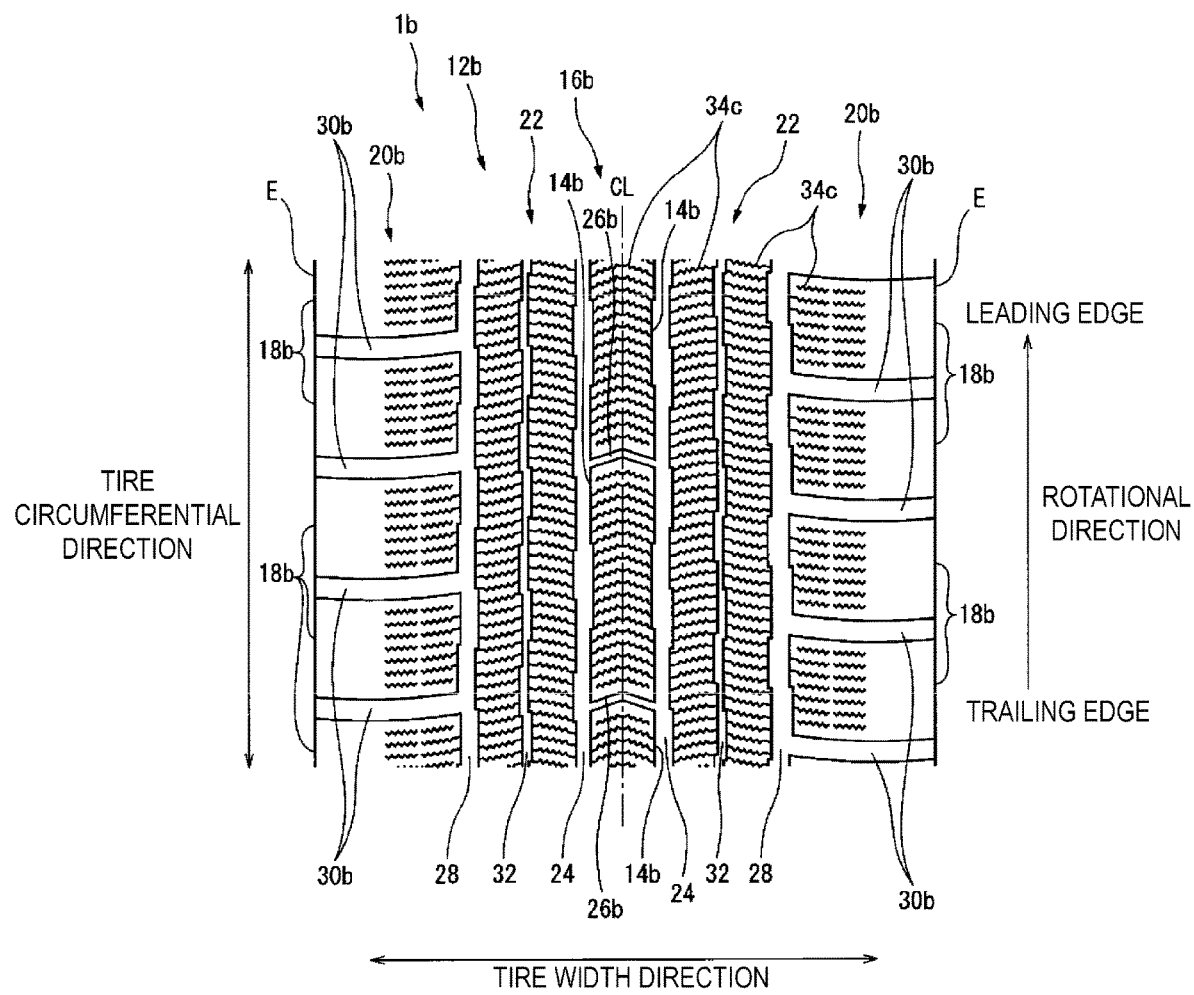
FIG. 4 is a developed plan view of a tread surface of a pneumatic tire according to an additional embodiment of the present technology.

FIG. 4 is a developed plan view of a tread surface of a pneumatic tire according to an Additional Embodiment of the present technology. Note that the symbol E in FIG. 4 indicates the tire ground contact edge. In FIG. 4, the same reference numbers are applied to constituents that are the same as the constituents of FIG. 1. In a pneumatic tire 1b, a tread surface 12b has a directional pattern, and the rotational direction (the tire rotational direction when the vehicle is moving forward) is designated. With the pneumatic tire 1b, when the vehicle is moving forward, the leading edge contacts the ground before the trailing edge illustrated in FIG. 4. With the pneumatic tire 1b, first lateral grooves 26b and second lateral grooves 30b extend at an inclination to the trailing edge from the inner side to the outer side in the tire width direction.

By giving the pneumatic tire 1b a directional pattern and designating the tire rotational direction, when the vehicle is moving forward, water drainage from the leading edge to the trailing edge is promoted, so the water drainage properties can be improved.

Additional Embodiment 9

In an embodiment that combines the Basic Embodiment with Additional Embodiment 8, preferably, the sipes are defined by a first wall surface and a second wall surface, the first wall surface and the second wall surface have a projecting part that is not perpendicular to the tread surface, and, are configured so that the amount of collapse in the tire circumferential direction of the first set of blocks, the second set of blocks, and the ribs is greater when a load is applied from the second wall surface side toward the first wall surface side than when a load is applied from the first wall surface side toward the second wall surface side. In the sipes formed in a region of the rib on the inner side in the tire width direction from the third circumferential groove and the sipes formed in the first set of blocks, the first wall surface is disposed on the leading edge in the tire rotational direction and the second wall surface is disposed on the trailing edge in the tire rotational direction. Also in the sipes formed in a region on the outer side in the tire width direction from the third circumferential groove of the rib and the sipes formed in the second set of blocks, the first wall surface is disposed on the trailing edge and the second wall surface is disposed on the leading edge (Additional Embodiment 9).

Figure 5:
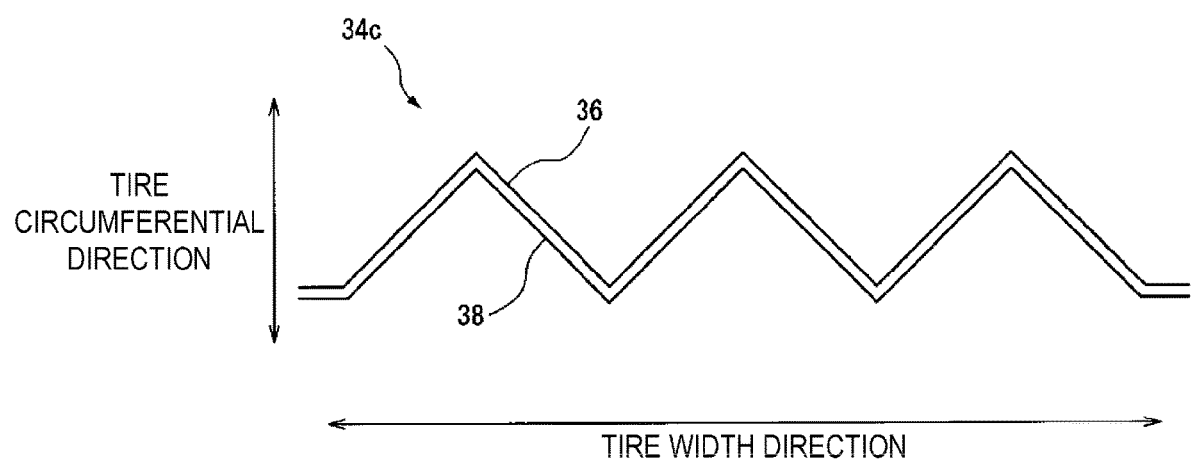
FIG. 5 is a schematic cross-sectional view of the sipe in FIG. 4.
Figure 6:
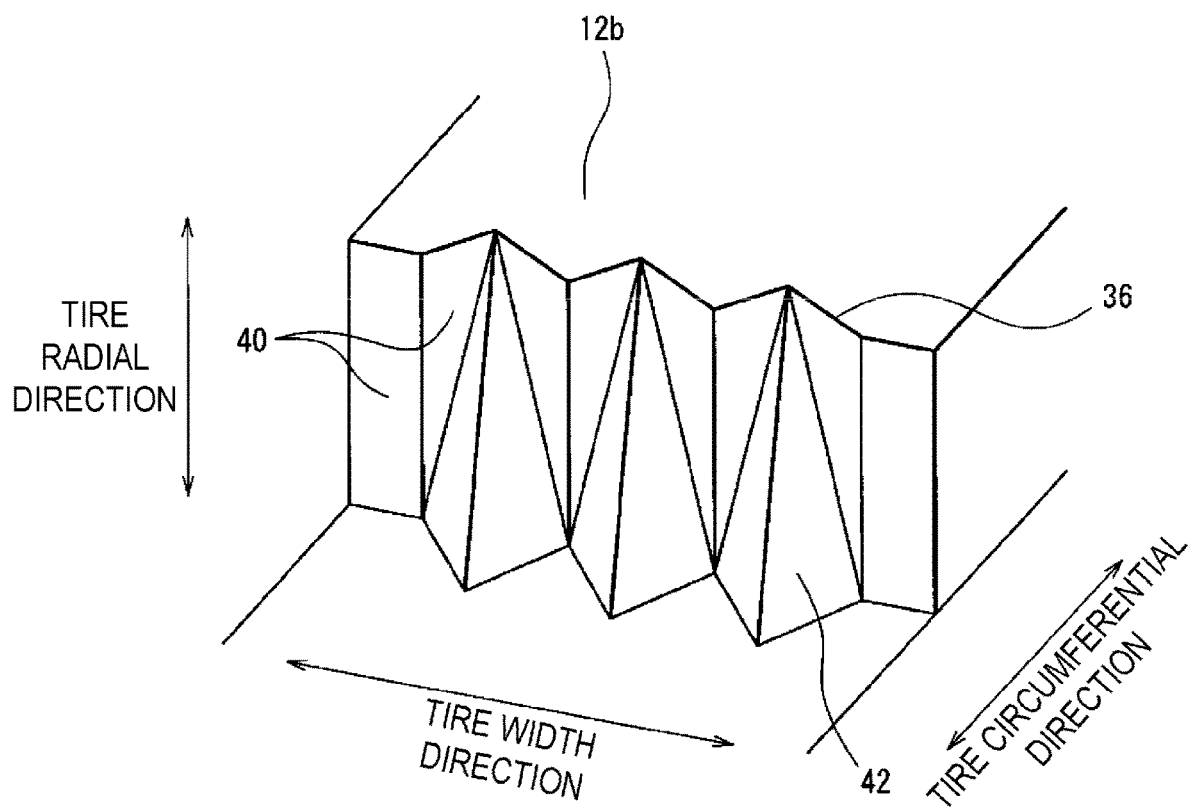
FIG. 6 is a schematic view illustrating the cross-sectional shape of the sipe in FIG. 4.

FIG. 5 is a schematic cross-sectional view of the sipes in FIG. 4. As illustrated in FIG. 5, a sipe 34c is defined by a first wall surface 36 and a second wall surface 38. FIG. 6 is a cross-sectional view illustrating the shape of the land portion on the first wall surface side of the sipe. In FIG. 6, for ease of understanding, the land portion on the second wall surface side of the sipe 34c has been omitted.

As illustrated in FIG. 6, the first wall surface 36 includes a vertical portion 40 that is normal to the tread surface 12b, and a protrusion 42 that is not normal to the tread surface 12b. The protrusion 42 is formed as a three-sided pyramid whose bottom surface is the groove bottom, protruding from the vertical portion 40 to one side in the tire circumferential direction. On the other hand, although not illustrated on the drawings, the second wall surface 38 includes a vertical portion that is normal to the tread surface 12b, and a protrusion that is not normal to the tread surface 12b. The protrusion of the second wall surface 38 is formed with a shape that is complementary to the three-sided pyramid of the projection 42 projecting from the vertical portion to the other side in the tire circumferential direction, so as to fill the space between the first wall surface 36 and the second wall surface 38.

During ground contact, when a load is applied in the tire circumferential direction to the first set of blocks 16b, the second set of blocks 20b, and the ribs 22 in which the sipe 34c is formed, the first wall surface 36 and the second wall surface 38 support each other. At this time, as can be seen from FIG. 6, the protrusion 42 of the first wall surface 36 is located on the inner side in the tire radial direction of the protrusion of the second wall surface 38. Therefore, the amount of collapse in the tire circumferential direction of the first set of blocks 16b, the second set of blocks 20b, and the ribs 22 is greater when the load is applied from the second wall surface 38 side toward the first wall surface 36 side than when the load is applied from the first wall surface 36 side toward the second wall surface 38 side.

In the tread pattern illustrated in FIG. 4, in the sipes 34c formed in the region on the inner side in the tire width direction of the third circumferential groove 32 of the rib 22 and the sipes 34c formed in the first set of blocks 16b, the first wall surface 36 is disposed on the leading edge in the tire rotational direction and the second wall surface 38 is disposed on the trailing edge in the tire rotational direction. Also, in the sipes 34c formed in the region on the outer side in the tire width direction of the third circumferential groove 32 of the rib 22 and the sipes 34c formed in the second set of blocks 20b, the first wall surface 36 is disposed on the trailing edge and the second wall surface 38 is disposed on the leading edge.

Therefore, the first set of blocks 16b and the ribs 22 provided on the inner side in the tire width direction do not easily collapse when a load is applied from the leading edge toward the trailing edge, and can collapse more easily when a load is applied from the trailing edge toward the leading edge. On the other hand, the second set of blocks 20b and the ribs 22 provided on the outer side in the tire width direction easily collapse when a load is applied from the leading edge toward the trailing edge, and do not easily collapse when a load is applied from the trailing edge toward the leading edge.

When the tire is rolling, the load is applied to the ground contact patch from the leading edge toward the trailing edge. At this time, the first set of blocks 16b and the ribs 22 provided on the inner side in the tire width direction do not easily collapse, so these regions maintain excellent driving performance. On the other hand, when the tire is braking, the load is applied to the ground contact patch from the trailing edge toward the leading edge. At this time, the second set of blocks 20b and the ribs 22 provided on the outer side in the tire width direction do not easily collapse, so these regions maintain excellent braking performance.

Note that the protrusion 42 of the first wall surface 36 may have a shape in which the three-sided pyramid continues across two or more steps in the tire radial direction. In this case also, the protrusion of the second wall surface 38 has a shape that is complimentary with the protrusion 42 of the first wall surface 36. Also, the first wall surface 36 and the second wall surface 38 may have a different shape, provided the amount of collapse in the tire circumferential direction of the first set of blocks 16b, the second set of blocks 20b, and the ribs 22 is greater when the load is applied from the second wall surface 38 side toward the first wall surface 36 side than when the load is applied from the first wall surface 36 side toward the second wall surface 38 side.

Additional Embodiment 10

In the Basic Embodiment or an embodiment that combines the Basic Embodiment with Additional Embodiment 1 and the like, preferably, the snow traction index STI is not less than 160 and not more than 240 (Additional Embodiment 10).

The snow traction index STI is an index indicating the level of braking performance on snow and the level of braking performance on ice, and is defined by the following equation.

$$STI = -6.8 + 2202\rho_g + 672\rho_s + 7.6 D_g$$

where $\rho_g$ is (total length projected in the tire width direction of all the grooves provided on the tread surface)/(ground contact width×tire circumferential length) (1/mm), $\rho_s$ is (total length projected in tire width direction of all the sipes provided on the tread surface)/(ground contact width×tire circumferential length), and $D_g$ is the average groove depth.

Here, the ground contact width means the maximum width in the tire width direction of the ground contact surface when the pneumatic tire is fitted to a standard rim, inflated to the standard inner pressure, and 85% of the standard load is applied. Note that "standard rim" means an "application rim" as defined by the Japan Automobile Tyre Manufacturers Association Inc. (JATMA), a "design rim" as defined by the Tire and Rim Association, Inc. (TRA), or a "measuring rim" as defined by the European Tyre and Rim Technical Organisation (ETRTO). Also, "standard inner pressure" means the "maximum air pressure" as defined by JATMA, the maximum value in "tire load limits at various cold inflation pressures" as defined by TRA, or "inflation pressure" defined by ETRTO. In addition, "standard load" means "maximum load capacity" defined by JATMA, the maximum value in "tire load limits at various cold inflation pressures" defined by TRA, or "load capacity" defined by ETRTO.

My making the STI not less than 160, the amount of edge of the grooves and sipes can be maintained, so the braking performance on snow and the braking performance on ice can be further improved. Also, by making the STI not more than 240, the reduction in the block rigidity due to too many grooves and sipes can be minimized, so the ground surface area can be maintained. As a result, the braking performance on ice can be further improved.

Additional Embodiment 11

In the Basic Embodiment or an embodiment that combines the Basic Embodiment with Additional Embodiment 1 and the like, preferably, the JIS A hardness of a cap rubber layer of the tread portion is not less than 40 and not more than 60 (Additional Embodiment 11). Here, cap rubber layer means a rubber layer in the outermost portion in the tire radial direction of the tread portion. Also, in this Specification, JIS A hardness means the value measured under the condition of 0° measurement temperature.

By making the JIS A hardness of the cap rubber layer of the tread portion not less than 40, the stiffness of the tread surface 12a, 12b can be maintained, so collapse of the first set of blocks 16a, 16b, the second set of blocks 20a, 20b, and the ribs 22 can be minimized, and the ground contact area can be ensured. As a result, the braking performance on ice can be further improved. Also, by making the JIS A hardness of the cap rubber layer of the tread portion not more than 60, degradation of the road surface tracking properties caused by the tread surface 12a, 12b being too hard can be minimized, so the snow can be effectively compacted during ground contact. As a result, the shear force of the snow can be increased, and therefore the reduction in braking performance on snow can be further minimized.

Note that by making the JIS A hardness of the cap rubber layer of the tread portion not less than 40 and not more than 50, the above effect can be exhibited at a higher level.

Examples

A total of 12 pneumatic tires were manufactured, a Conventional Example and Working Example 1 to Working Example 11, changing each of the conditions as shown in Table 1 (tread pattern, presence/absence of an offset in the second circumferential groove, amount of offset of the second circumferential groove, presence/absence of offset in the first circumferential groove, amount of offset in the first circumferential groove, presence/absence of offset in the third circumferential groove, amount of offset in the third circumferential groove, type of sipe, STI, JIS A hardness of cap rubber layer).

The tires of the Conventional Example and Working Example 1 to Working Example 11 (the test tires) had a tire size 195/65R15. Four of each test tire were fitted to a 15×6J rim, inflated with an air pressure of 220 kPa, and mounted on a sedan vehicle with an engine displacement of 1500 cc. The braking performance on ice and the braking performance on snow were evaluated for all the test tires as follows. The results are shown on Table 1.

Braking Performance on Ice:
On an ice road surface, the braking distance was measured from a condition when traveling at 40 km/hour, and an index evaluation was carried out with the Conventional Example as the reference (100). In the evaluation, a larger index value indicates superior braking performance on ice.

Braking Performance on Snow:
On a snowy road surface, the braking distance was measured from a condition when traveling at 40 km/hour, and an index evaluation was carried out with the Conventional Example as the reference (100). In the evaluation, a larger index value indicates superior braking performance on snow.

TABLE 1

Figure 7:
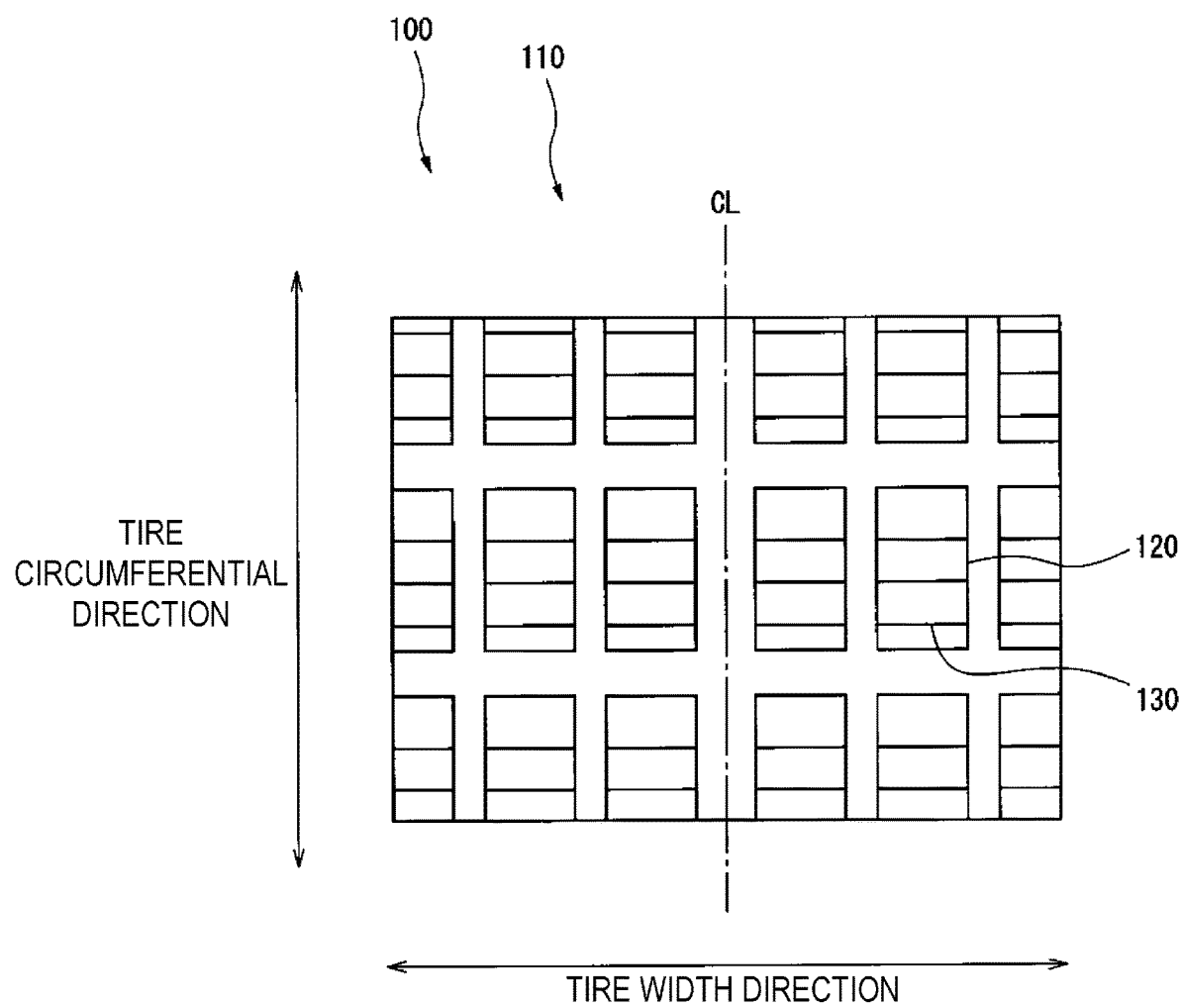
FIG. 7 is a developed plan view of a tread surface of a pneumatic tire according to conventional technology.

|  | Conventional Example | Working Example 1 | Working Example 2 | Working Example 3 | Working Example 4 | Working Example 5 |
|---|---|---|---|---|---|---|
| Tread pattern | FIG. 7 | FIG. 1 | FIG. 1 | FIG. 1 | FIG. 1 | FIG. 1 |
| Presence/absence of offset in second circumferential groove |  | Absent | Present | Present | Present | Present |
| Amount of offset in second circumferential groove (mm) |  |  | 0.4 | 1 | 1 | 1 |
| Presence/absence of offset in first circumferential groove |  | Absent | Absent | Absent | Present | Present |
| Amount of offset in first circumferential groove (mm) |  |  |  |  | 0.4 | 1 |
| Presence/absence of offset in third circumferential groove |  | Absent | Absent | Absent | Absent | Absent |
| Amount of offset in third circumferential groove (mm) |  |  |  |  |  |  |
| Type of sipe | FIG. 7 | FIG. 1 | FIG. 1 | FIG. 1 | FIG. 1 | FIG. 1 |
| STI | 180 | 190 | 192 | 195 | 197 | 200 |
| JIS A hardness of cap rubber layer | 50 | 65 | 65 | 65 | 65 | 65 |
| Braking performance on ice | 100 | 105 | 105 | 107 | 107 | 109 |
| Braking performance on snow | 100 | 97 | 98 | 99 | 100 | 101 |

|  | Working Example 6 | Working Example 7 | Working Example 8 | Working Example 9 | Working Example 10 | Working Example 11 |
|---|---|---|---|---|---|---|
| Tread pattern | FIG. 1 | FIG. 1 | FIG. 1 | FIG. 1 | FIG. 4 | FIG. 4 |
| Presence/absence of | Present | Present | Present | Present | Present | Present |

TABLE 1-continued

| | | | | | | |
|---|---|---|---|---|---|---|
| offset in second circumferential groove | | | | | | |
| Amount of offset in second circumferential groove (mm) | 1 | 1 | 1 | 1 | 1 | 1 |
| Presence/absence of offset in first circumferential groove | Present | Present | Present | Present | Present | Present |
| Amount of offset in first circumferential groove (mm) | 1 | 1 | 1 | 1 | 1 | 1 |
| Presence/absence of offset in third circumferential groove | Present | Present | Present | Present | Present | Present |
| Amount of offset in third circumferential groove (mm) | 0.4 | 1 | 1 | 1 | 1 | 1 |
| Type of sipe | FIG. 1 | FIG. 1 | FIG. 3 | FIG. 3 | FIG. 6 | FIG. 6 |
| STI | 202 | 205 | 205 | 205 | 205 | 205 |
| JIS A hardness of cap rubber layer | 65 | 65 | 65 | 65 | 65 | 45 |
| Braking performance on ice | 109 | 110 | 111 | 111 | 111 | 115 |
| Braking performance on snow | 102 | 103 | 104 | 105 | 104 | 107 |

According to Table 1, it can be seen that with the pneumatic tires according to Working Example 1 to Working Example 11 that complied with the technical scope of the present technology, the braking performance on ice and the braking performance on snow are improved in a well-balanced manner in each case compared with the pneumatic tire according to the Conventional Example, which did not comply with the technical scope of the present technology.

The invention claimed is:

1. A pneumatic tire, comprising:
a first set of blocks partitioned and formed by two first circumferential grooves and a plurality of first lateral grooves provided in a center region that includes a tire equatorial plane, the first set of blocks including a first portion on a first side of the tire equatorial plane and a second portion on a second side of the tire equatorial plane, the first and second portions mirroring one another;
a second set of blocks partitioned and formed by one second circumferential groove and a plurality of second lateral grooves provided in an outermost portion in a tire width direction on each side in the tire width direction;
a first rib provided between the first set of blocks and the second set of blocks on a first side in the tire width direction, the first rib being divided by at least a third circumferential groove,
a second rib provided between the first set of blocks and the second set of blocks on a second side in the tire width direction, the second rib being divided by at least another third circumferential groove,
wherein the first rib and the second rib are continuous land portions in a tire circumferential direction and undivided by lateral grooves;
a plurality of sipes formed in the first set of blocks, the second sets of blocks, and the first rib and the second rib; and
all of the sipes of plurality of sipes included in the first set of blocks extend across an entire width of first blocks in the first set of blocks and open to the two first circumferential grooves except end sipes which are closest to both ends of the first blocks in the tire circumferential direction, the end sipes terminating within the first blocks without communicating to the two first circumferential grooves.

2. The pneumatic tire according to claim 1, wherein the second circumferential groove is offset in the tire width direction in at least two locations in the tire circumferential direction.

3. The pneumatic tire according to claim 2, wherein an amount of the offset of the second circumferential groove is not less than 0.5 mm and not more than 3.0 mm.

4. The pneumatic tire according to claim 2, wherein the first circumferential groove is offset in the tire width direction in at least two locations in the tire circumferential direction.

5. The pneumatic tire according to claim 4, wherein the amount of the offset of the first circumferential groove is not less than 0.5 mm and not more than 3.0 mm.

6. The pneumatic tire according to claim 2, wherein the third circumferential groove is offset in the tire width direction in at least two locations in the tire circumferential direction.

7. The pneumatic tire according to claim 6, wherein the amount of the offset of the third circumferential groove is not less than 0.5 mm and not more than 3.0 mm.

8. The pneumatic tire according to claim 1, wherein the sipe is a three-dimensional sipe.

9. The pneumatic tire according to claim 1, wherein the tire has a directional pattern, and the tire rolling direction is designated.

10. The pneumatic tire according to claim 9, wherein the sipes are defined by a first wall surface and a second wall surface, the first wall surface and the second wall surface have a protrusion that is not normal to a tread surface, and, are configured so that an amount of collapse in the tire circumferential direction of the first set of blocks, the second set of blocks, and the ribs is greater when a load is applied from a second wall surface side toward a first wall surface side than when a load is applied from the first wall surface side toward the second wall surface side, in the sipes formed in a region on an inner side in the tire width direction from the third circumferential groove of the rib and the sipes formed in the first set of blocks, the first wall surface is disposed on a leading edge in a tire rotational direction and the second wall surface is disposed on a trailing edge in the tire rotational direction, and in the sipes formed in a region on an outer side in the tire width direction from the third circumferential groove of the rib and the sipes formed in the second set of blocks, the first wall surface is disposed on the trailing edge and the second wall surface is disposed on the leading edge.

11. The pneumatic tire according to claim 1, wherein a snow traction index STI is not less than 160 and not more than 240.

12. The pneumatic tire according to claim 1, wherein a JIS A hardness of a cap rubber layer of a tread portion is not less than 40 and not more than 60.

13. The pneumatic tire according to claim 1, wherein all circumferential groove walls formed by ribs on sides of all of the first, second and third circumferential grooves have offsets in the tire width direction in at least two locations in the tire circumferential direction, and all circumferential groove walls formed by blocks have an offset in the tire width direction in at least one location in the tire circumferential direction.

14. The pneumatic tire according to claim 1, wherein the first and second ribs are non-mirrored duplicates which are aligned in the tire circumferential direction.

15. The pneumatic tire according to claim 1, wherein sipe patterns in a depth direction of sipes adjacent in the tire circumferential direction are opposite one another.

16. The pneumatic tire according to claim 1, wherein:
the outermost portion includes shoulder blocks including two separate columns of sipes aligned in the tire circumferential direction and forming aligned rows of sipes in the tire width direction;
a majority of the sipes in the shoulder blocks are closed and do not open to the second circumferential groove; and
of sipes in the shoulder blocks adjacent to the second circumferential groove, end sipes in a tire circumferential direction and a middle sipe in the tire circumferential direction do not open to the second circumferential groove while sipes between the end and middle sipes, and which are adjacent to the second circumferential groove, all open to the second circumferential groove.

17. A pneumatic tire, comprising:
a first set of blocks partitioned and formed by two first circumferential grooves and a plurality of first lateral grooves provided in a center region that includes a tire equatorial plane, the first set of blocks including a first portion on a first side of the tire equatorial plane and a second portion on a second side of the tire equatorial plane, the first and second portions mirroring one another;

a second set of blocks partitioned and formed by one second circumferential groove and a plurality of second lateral grooves provided in an outermost portion in a tire width direction on each side in the tire width direction;

a first rib provided between the first set of blocks and the second set of blocks on a first side in the tire width direction, the first rib being divided by at least a third circumferential groove;

a second rib provided between the first set of blocks and the second set of blocks on a second side in the tire width direction, the second rib being divided by at least another third circumferential groove; wherein the first rib and the second rib are continuous land portions in a tire circumferential direction and undivided by lateral grooves;

a plurality of sipes formed in the first set of blocks, the second sets of blocks, and the first rib and the second rib;

the outermost portion includes shoulder blocks including two separate columns of sipes aligned in the tire circumferential direction and forming aligned rows of sipes in the tire width direction;

a majority of the sipes in the shoulder blocks are closed and do not open to the second circumferential groove; and of sipes in the shoulder blocks adjacent to the second circumferential groove, end sipes in a tire circumferential direction and a middle sipe in the tire circumferential direction do not open to the second circumferential groove while sipes between the end and middle sipes, and which are adjacent to the second circumferential groove, all open to the second circumferential groove.

\* \* \* \* \*